United States Patent
Liu

(10) Patent No.: US 9,641,289 B2
(45) Date of Patent: May 2, 2017

(54) DATA TRANSMISSION METHOD AND APPARATUS

(71) Applicant: Huawei Technologies Co., Ltd., Shenzhen, Guangdong (CN)

(72) Inventor: Pei Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 311 days.

(21) Appl. No.: 14/515,096

(22) Filed: Oct. 15, 2014

(65) Prior Publication Data
US 2015/0030011 A1 Jan. 29, 2015

Related U.S. Application Data

(63) Continuation of application No. PCT/CN2013/071996, filed on Feb. 28, 2013.

(30) Foreign Application Priority Data

Apr. 16, 2012 (CN) .......................... 2012 1 0110922

(51) Int. Cl.
*H04L 1/08* (2006.01)
*H04J 3/16* (2006.01)
(Continued)

(52) U.S. Cl.
CPC .................. *H04L 1/08* (2013.01); *H04J 3/16* (2013.01); *H04L 1/1887* (2013.01);
(Continued)

(58) Field of Classification Search
CPC . H04W 84/18; H04W 52/0216; H04W 74/02; H04W 52/0232
See application file for complete search history.

(56) References Cited

U.S. PATENT DOCUMENTS

2008/0253328 A1* 10/2008 Sahinoglu ............. H04W 74/02
370/330
2009/0238160 A1 9/2009 Bhatti et al.
(Continued)

FOREIGN PATENT DOCUMENTS

CN 101667907 A 3/2010
CN 101951640 A 1/2011
(Continued)

OTHER PUBLICATIONS

Cheng et al., "A new GTS allocation scheme for IEEE 802.15.4 networks with improved bandwidth utilization," International Symposium on Communications and Information Technologies, pp. 1143-1148, Institute of Electrical and Electronics Engineers, New York, New York (Oct. 17-19, 2007).
(Continued)

*Primary Examiner* — Jeffrey M Rutkowski
*Assistant Examiner* — Romani Ohri
(74) *Attorney, Agent, or Firm* — Leydig, Voit & Mayer, Ltd.

(57) ABSTRACT

The disclosed is a data transmission method and apparatus configured to establish a frequency hopping-retransmission mechanism in a CFP of a superframe and switch a channel accordingly. The method provided by an embodiment includes: selecting two channels as a prescribed channel and a spare channel; dividing a CFP of a superframe into three SCFPs, where a second SCFP is used to re-transmit data that a node fails to transmit in a first SCFP, a third SCFP is used to re-transmit data that the node fails to transmit in the second SCFP, and a timeslot position of each node in the first SCFP is the same as in the second SCFP; broadcasting a beacon frame on the prescribed channel in a beacon period of the superframe, where the beacon frame includes channel selection information and timeslot division information;
(Continued)

receiving data from the node; and transmitting an acknowledgement frame.

16 Claims, 11 Drawing Sheets

(51) Int. Cl.
   *H04L 5/00* (2006.01)
   *H04L 1/18* (2006.01)
   *H04W 74/00* (2009.01)

(52) U.S. Cl.
   CPC .......... *H04L 1/1893* (2013.01); *H04L 5/0055* (2013.01); *H04W 74/006* (2013.01)

(56) References Cited

U.S. PATENT DOCUMENTS

| | | | |
|---|---|---|---|
| 2010/0124238 A1 | 5/2010 | Hong et al. | |
| 2010/0260085 A1* | 10/2010 | Wang | H04W 74/02 370/311 |
| 2010/0265923 A1* | 10/2010 | Choi | H04L 1/1887 370/336 |
| 2011/0038343 A1 | 2/2011 | Bhatti et al. | |
| 2011/0310770 A1* | 12/2011 | Liang | H04W 84/18 370/254 |
| 2012/0213062 A1 | 8/2012 | Liang et al. | |

FOREIGN PATENT DOCUMENTS

| | | |
|---|---|---|
| CN | 102104522 A | 6/2011 |
| CN | 102122973 A | 7/2011 |
| CN | 102857327 A | 1/2013 |
| EP | 1605622 A2 | 12/2005 |
| WO | WO 2011102700 A2 | 8/2011 |

OTHER PUBLICATIONS

"Information technology—Telecommunications and information exchange between systems—Local and metropolitan area networks—Specific requirements—Part 11: Wireless LAN Medium Access Control (MAC) and Physical Layer (PHY) Specifications," pp. I-512, Std. 802.11, 1999 Edition, Institute of Electrical and Electronics Engineers, New York, New York (Jun. 12, 2003).

\* cited by examiner

DATA TRANSMISSION METHOD AND APPARATUS

CROSS-REFERENCE TO RELATED APPLICATIONS

This application is a continuation of International Patent Application No. PCT/CN2013/071996, filed on Feb. 28, 2013, which claims priority to Chinese Patent Application No. 201210110922.9, filed on Apr. 16, 2012, both of which are hereby incorporated by reference in their entireties.

TECHNICAL FIELD

The present invention relates to the field of communications technologies, and in particular, to a data transmission method and apparatus.

BACKGROUND

There exists a problem of co-channel interference between ZigBee and both wireless fidelity (WiFi, Wireless Fidelity) and Bluetooth. In addition, when ZigBee works at a 2.4 GHz frequency band, penetration and sensitivity of data transmission are relatively poor, and data transmission distance is also unsatisfactory. A spread spectrum technology used by WiFi has a great influence on ZigBee. ZigBee cannot work in places where there are WiFi hot spots. In a wireless meter reading system, a mainstream technology is a proprietary wireless ad-hoc network technology designed for a low-frequency ISM (Industrial Scientific Medical) frequency band, where the frequency bands include 915 MHz, 868 MHz, 433 MHz, and a newly released frequency band of 470-510 MHz. Networking in a low frequency band proves advantageous in terms of transmission distance (in particular, transmission distance at frequency bands 433 MHz and 470-510 MHz is five times longer than transmission distance of ZigBee), and can avoid co-channel interference with WiFi and Bluetooth. However, even if a frequency band of 470-510 MHz is used for communication, when a node is in an application scenario in which meters are deployed densely and in a complex and changeable cell electromagnetic environment, a communication link is also prone to unpredictable interference in time and space, which poses a great challenge to reliability of data interaction. According to features of the wireless meter reading scenario, a beacon interval in one personal area network (PAN, Personal Area Network) is relatively long and a duty cycle of an active period is relatively small. Therefore, channel quality determined by a gateway according to channel scanning defined in the GB/T15629.15-2010 standard cannot keep up with the pace of change in a relatively complex indoor electromagnetic environment (the channel quality changes quickly within a small time range). In addition, there is no request to send/clear to send (RTS/CTS, Request To Send/Clear To Send) handshake mechanism in GB/T15629.15. Consequently, it is likely that a channel which is dynamically selected according to the existing protocol is also exposed to interference from other interference signals suddenly after a next superframe period starts, which reduces a one-time data collection success rate. Using an adaptive frequency-hopping technology in combination with retransmission is a direct and effective approach to solving a problem of burst communication interference.

In the prior art, an adaptive frequency-hopping technology is used in combination with retransmission in the following two manners to solve the problem of burst communication interference:

First manner: An improvement is made to a beacon frame defined in the IEEE802.15.4 standard. For a star topology, a conventional 802.15.4 superframe structure is designed as multiple small superframes separated by a group acknowledge frame (GACK, Group acknowledge frame). The GACK frame further indicates that a new guaranteed timeslot (GTS, Guaranteed Timeslot) for a subsequent extended contention free period (ECFP, Extended Contention Free Period), and the new GTS is allocated to a node that needs to perform retransmission due to a previous transmission failure and a node that applies for a resource in the GTS temporarily to process a burst data stream. In this way, overheads during data interactions are reduced by way of GACK and data interaction is accelerated. For a point to point topology, a management timeslot is defined at the beginning of a superframe to inform a whole network of a newly joined/leaved full functional device (FFD, Full Functional Device) on a whole network, and a beacon timeslot in the FFD is also defined, in order to conveniently acquire communication information of a neighboring FFD. Based on information in a beacon frame, a superframe period is adjustable, a channel used in each announcement cycle (Announcement Cycle) may be different, and each PAN also uses a different channel.

However, in the foregoing technical solutions, an average data interaction rate can be increased by way of GACK, only on condition that channel quality is continuously good. Once a link failure occurs, some nodes cannot receive a GACK frame, and information in GACK messages will increase. If channel quality remains poor, a length of a GACK message increases cumulatively. In addition, if a node is disconnected from the network and a prescribed channel or a spare channel is not specified to listen to a beacon, re-initiating a network access process causes power usage to multiply.

Second manner: A two-level adaptive frequency hopping solution oriented to a clustering wireless sensor is used. For a two-layer topology that combines a star topology and a mesh topology and is applied on wireless networks for industrial automation-process automation (WIA-PA, Wireless Networks for Industrial Automation-Process Automation), content of a beacon frame payload is extended and a superframe is improved, in order to implement two-level adaptive frequency hopping, where a phase adaptive frequency hopping (PAFH, Phase Adaptive Frequency Hopping) is used at a beacon period, a contention access period (CAP, Contention Access Period) phase, and a contention free period (CFP, Contention Free Period) of the active period, that is, a same channel is used at these three phases within a same superframe period, and a channel is switched in different superframe periods according to a channel condition; a timeslot adaptive frequency hopping (TAFH, Timeslot Adaptive Frequency Hopping) is used at an intra-cluster communication phase of an inactive period, that is, a communication channel is changed, according to a channel condition, at each timeslot at the intra-cluster communication phase.

However, in the foregoing technical solution, it takes too long to switch a used channel in each superframe period to implement communication, due to a series of procedures such as measurement, judgment, and delivery, and therefore channel switching cannot keep up with the pace of change in channel quality; when an intra-cluster node or a cluster head node uploads measured channel information to the cluster head node or an aggregation node, a large amount of bandwidth resource is occupied and each node on the network needs to measure state information of the used channel periodically, which occupies a large cache capacity of a node device, reduces a processing speed of a device, and increases power consumption of the device.

SUMMARY

Embodiments of the present invention provide a data transmission method and apparatus to establish a frequency hopping-retransmission mechanism at a CFP phase and flexibly respond to unpredictable interference in time and space, thereby improving reliability of data interaction.

A data transmission method provided by an embodiment of the present invention includes: selecting, by a coordinator, two channels as a prescribed channel and a spare channel respectively, and generating channel selection information, where the prescribed channel is used to re-transmit data that a node fails to transmit on another channel, and the spare channel is used to re-transmit data that the node fails to transmit on the prescribed channel; dividing, a contention free period CFP of a superframe into three son contention free periods SCFPs, and generating timeslot division information, where the three SCFPs include a first SCFP, a second SCFP, and a third SCFP; the second SCFP is used to re-transmit data that the node fails to transmit in the first SCFP; the third SCFP is used to re-transmit data that the node fails to transmit in the second SCFP; and a timeslot position of each node in the first SCFP is the same as in the second SCFP; broadcasting a beacon frame on the prescribed channel in a beacon period of the superframe, where the beacon frame includes the channel selection information and the timeslot division information; receiving data that the node transmits based on the channel selection information and the timeslot division information, and transmitting an acknowledgement frame.

A data transmission method provided by an embodiment of the present invention includes: receiving, by a node, a beacon frame, where the beacon frame includes channel division information and timeslot division information, the channel division information includes information of a prescribed channel and a spare channel selected by a coordinator, and the timeslot division information includes information of three son contention free periods SCFPs which are divided from a contention free period CFP of a superframe, where the three SCFPs includes a first SCFP, a second SCFP, and a third SCFP and a timeslot position of each node in the first SCFP is the same as in the second SCFP; transmitting, according to the channel division information and the timeslot division information, data on an allocated channel in the first SCFP; if data fails to be transmitted on the allocated channel in the first SCFP, switching to the prescribed channel according to the timeslot division information and the channel division information, and re-transmitting the data on the prescribed channel in the second SCFP; and if data fails to be transmitted on the prescribed channel in the second SCFP, switching to the spare channel and re-transmitting the data on the spare channel in the third SCFP.

A coordinator provided by an embodiment of the present invention includes: a selecting unit, configured to select two channels as a prescribed channel and a spare channel respectively, and generate channel selection information, where the prescribed channel is used to re-transmit data that a node fails to transmit on another channel, and the spare channel is used to re-transmit data that the node fails to transmit on the prescribed channel; a dividing unit, configured to divide a contention free period CFP of a superframe into three son contention free periods SCFPs, and generate timeslot division information, where the three SCFPs include a first SCFP, a second SCFP, and a third SCFP; the second SCFP is used to re-transmit data that the node fails to transmit in the first SCFP; the third SCFP is used to re-transmit data that the node fails to transmit in the second SCFP; and a timeslot position of each node in the first SCFP is the same as in the second SCFP; a broadcasting unit, configured to broadcast a beacon frame on the prescribed channel in a beacon period of the superframe, where the beacon frame includes the channel selection information and the timeslot division information; a data receiving unit, configured to receive data that the node transmits based on the channel selection information and the timeslot division information; and a transmitting unit, configured to transmit an acknowledgement frame.

A node provided by an embodiment of the present invention includes: a receiving unit, configured to receive a beacon frame, where the beacon frame includes channel division information and timeslot division information, the channel division information includes information of a prescribed channel and a spare channel selected by a coordinator, and the timeslot division information includes information of three son contention free periods SCFPs which are divided from a contention free period CFP of a superframe, where the three SCFPs include a first SCFP, a second SCFP, and a third SCFP and a timeslot position of each node in the first SCFP is the same as in the second SCFP; a data transmitting unit, configured to transmit, according to the channel division information and the timeslot division information, data on an allocated channel in the first SCFP; a channel switching unit, configured to: if data fails to be transmitted on the allocated channel in the first SCFP, switch to the prescribed channel according to the timeslot division information and the channel division information; and if data fails to be transmitted on the prescribed channel in the second SCFP, switch to the spare channel; the data transmitting unit is further configured to re-transmit the data on the prescribed channel in the second SCFP after the node switches to the prescribed channel, and re-transmit the data in the third SCFP after the node switches to the spare channel.

It can be seen from the foregoing technical solutions that, the embodiments of the present invention have the following advantages: A coordinator selects two channels as a prescribed channel and a spare channel respectively, where the prescribed channel is used to re-transmit data that a node fails to transmit on another channel, and the spare channel is used to re-transmit data that the node fails to transmit on the prescribed channel; the coordinator divides a CFP of a superframe into a first SCFP, a second SCFP, and a third SCFP, and uses channel quality of each SCFP as a basis for transmitting data; if the node fails to transmit data in a previous SCFP, the node may immediately switch, in a next SCFP, to another channel of better channel quality to re-transmit the data, which shortens a switching period and improves data transmission efficiency; the coordinator broadcasts a beacon frame on the prescribed channel in a beacon period of the superframe, where the beacon frame includes channel selection information and timeslot division information to notify a node of this information, so that after the node receives the beacon frame, the node implements data transmission according to the foregoing channel selection information and the timeslot division information within the superframe; the coordinator receives data sent by the node, and transmits an acknowledgment message to the node that has transmitted data successfully, so that the node makes statistics of received data and transmitted data. In this way, the node determines channel quality according to data transmission situations to switch a channel accordingly within a superframe to implement data transmission, which shortens a switching period, improves a processing speed of a device, and ensures a timely response to unpredictable interference, thereby improving reliability of data interaction.

DESCRIPTION OF EMBODIMENTS

Embodiments of the present invention provide a data transmission method and apparatus to establish a frequency hopping-retransmission mechanism in a CFP of one superframe and switch a channel accordingly to implement data transmission, which shortens a switching period, increases a processing speed of a device, and ensures a timely response to unpredictable interference, thereby improving reliability of data interaction.

Figure 1:
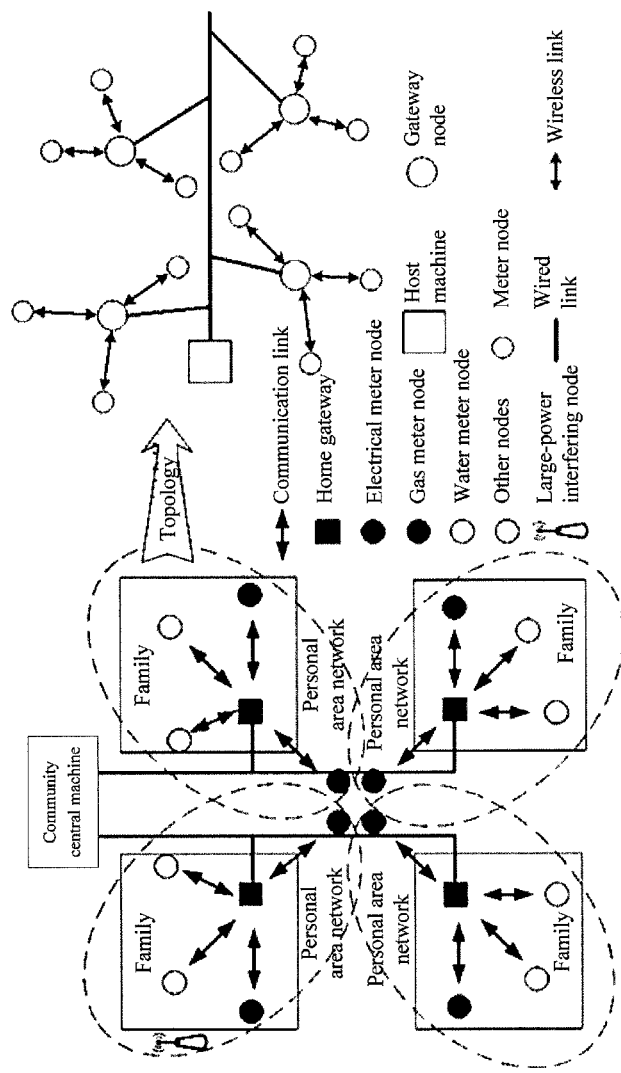
FIG. 1 is a schematic diagram of a typical application scenario of a data transmission method according to an embodiment of the present invention.

For the technical solutions provided by the embodiments of the present invention, a typical application scenario is shown in FIG. 1, where a star topology is formed between a home gateway and meter nodes in a meter reading system; a personal area network is formed for each family, and there is a home gateway in each family; the home gateway reads data from a water meter, a gas meter, and other sensor nodes in a family and from an electrical meter node at a power well, and uploads the data to a community center machine; the community center machine may perform accurate time synchronization with the home gateway according to a protocol, for example, the Network Time Protocol (NTP, Network Time Protocol); and the home gateway may perform time synchronization with the meter node by using a beacon, thereby creating a sound communication resource scheduling environment. A coordinator of the PAN is generally set inside the gateway, for ease of control.

Figure 2:
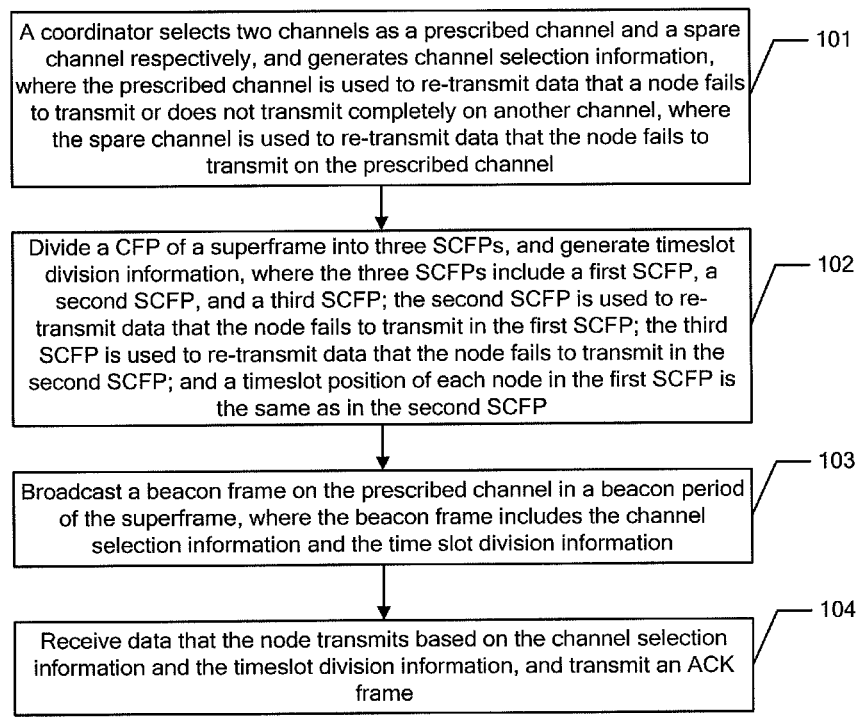
FIG. 2 is a schematic diagram of a data transmission method according to an embodiment of the present invention.

For the convenience of description, in the embodiments of the present invention, the technical solutions are described by taking a coordinator and a node as an example. It may be understood that, a network controller and a terminal device, or other receiving devices and transmission devices that have a similar function and can implement the technical solutions on a channel fall within the protection scope of the technical solutions of the embodiments of the present invention. Referring to FIG. 2, a data transmission method of an embodiment of the present invention includes:

101. A coordinator selects two channels as a prescribed channel and a spare channel respectively, and generates channel selection information, where the prescribed channel is used to re-transmit data that a node fails to transmit on another channel, and the spare channel is used to re-transmit data that the node fails to transmit on the prescribed channel.

In this embodiment, based on the GB/T15629.15-2010 standard, a frequency band of 470 Megahertz (MHz) to 510 Megahertz (MHz) is divided into multiple channels, each with a certain amount of bandwidth; a coordinator of a personal area network selects, according to channel quality, two channels as a prescribed channel (Prescribed Channel) and a spare channel (Spare Channel) respectively, and generates channel selection information, where the prescribed channel are used to re-transmit data that the node fails to transmit on another channel; the spare channel is used to re-transmit data that the node fails to transmit on the prescribed channel; and the prescribed channel is further used to transmit a beacon frame and is used by the node to apply for network access.

102. The coordinator divides a CFP of a superframe into three SCFPs, and generates timeslot division information, where the three SCFPs include a first SCFP, a second SCFP, and a third SCFP; the second SCFP is used to re-transmit data that the node fails to transmit in the first SCFP; the third SCFP is used to re-transmit data that the node fails to transmit in the second SCFP; and a timeslot position of each node in the first SCFP is the same as in the second SCFP.

Figure 3:
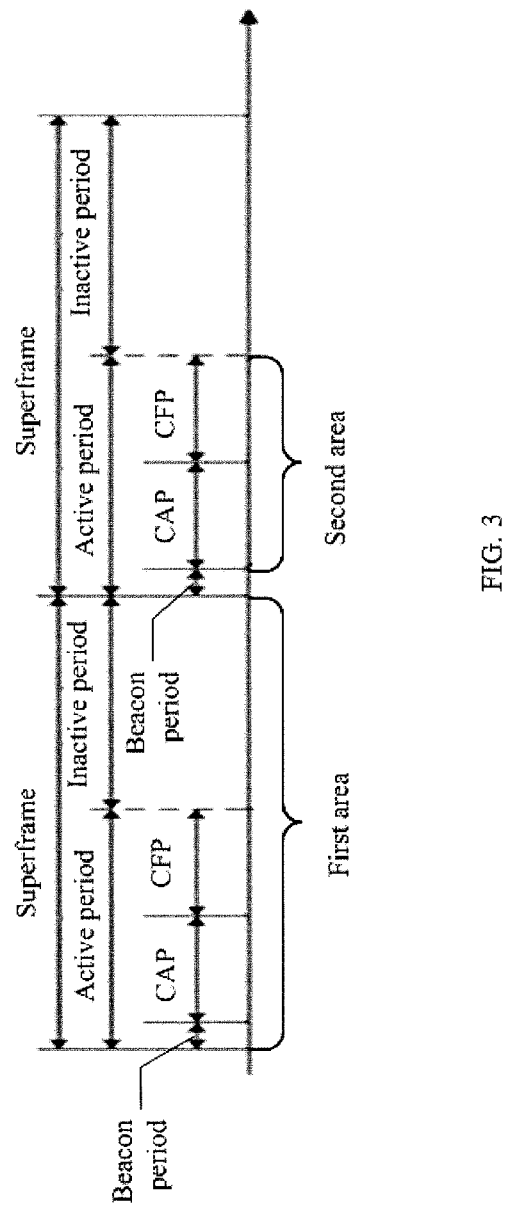
FIG. 3 illustrates a probability analysis of burst interference at different phases of a superframe.

Each superframe period includes a beacon period, a CAP period, a CFP period, and an inactive period, as shown in FIG. 3. In FIG. 3, there are two superframe periods; and in any one superframe period, an active period (CAP+CFP) is shorter than the whole superframe period, that is, burst interference is less likely to occur in the active period (a second area) than in the whole super-frame (a first area).

In this embodiment, a CFP of a same superframe is divided into three son contention free periods SCFPs (Son Contention Free Periods), that is, a first SCFP, a second, and a third SCFP, where the second SCFP is used to re-transmit data that the node fails to transmit in the first SCFP, the third SCFP is used to re-transmit data that the node fails to transmit in the second SCFP, and a timeslot position of each node in the first SCFP is the same as in the second SCFP, that is, for a node, the timeslot position in the first SCFP is the same as the timeslot position in the second SCFP. If the node fails to transmit data in a timeslot in the first SCFP, the node re-transmits the data in this timeslot in the second SCFP.

Because a same timeslot is used in the first SCFP and the second SCFP to re-transmit data, when the coordinator receives data in different timeslots, the coordinator may determine by which node the data is transmitted.

It should be noted that, a CFP of a superframe is divided into three SCFPs and channel quality of each SCFP is used as a basis for transmitting data. If data fails to be transmitted in the first SCFP, the node may switch immediately to another channel of better channel quality in the second SCFP to re-transmit the data. Compared with the prior method of determining channel quality and switching a channel on a per superframe basis, this method shortens a switching period and improves transmission efficiency.

In the first SCFP, the coordinator allocates a timeslot to each node; and during the allocation, it needs to be ensured that a length of each timeslot is sufficient for a meter node to complete a procedure (for example, 5 milliseconds) of uploading data and receiving an acknowledgement frame. Nodes transmit data in their respective allocated timeslots and channels.

103. The coordinator broadcasts, in a beacon period of the superframe, a beacon frame on the prescribed channel, where the beacon frame includes the channel selection information and the timeslot division information.

The beacon frame is transmitted in a first timeslot in the superframe, and the coordinator broadcasts the beacon frame on the selected prescribed channel in the beacon period of the same superframe, where the broadcast beacon frame includes the channel selection information and the timeslot division information; and a node that receives the broadcast beacon frame may learn, according to the channel selection information and the timeslot division information included in the beacon frame, the prescribed channel and the spare channel and information of the divided three SCFPs.

104. The coordinator receives data that the node transmits based on the channel selection information and the timeslot division information, and transmit an ACK frame.

Data that the node transmits based on the channel selection information and the timeslot division information is received, and an acknowledgement (ACK, Acknowledgement) frame is transmitted to the node that has transmitted the data successfully.

In this embodiment of the present invention, a coordinator selects two channels as a prescribed channel and a spare channel respectively, where the prescribed channel is used to re-transmit data that a node fails to transmit on another channel, and the spare channel is used to re-transmit data that the node fails to transmit on the prescribed channel; the coordinator divides a CFP of a superframe into a first SCFP, a second SCFP, and a third SCFP, and uses channel quality of each SCFP as a basis for transmitting data; if the node fails to transmit data in a previous SCFP, the node may immediately switch, in a next SCFP, to another channel of better channel quality to re-transmit the data, which shortens a switching period and improves data transmission efficiency; and the coordinator broadcasts a beacon frame on the prescribed channel in a beacon period of the superframe, where the beacon frame includes channel selection information and timeslot division information, to notify a node of this information, so that after the node receives the beacon frame, the node implements data transmission according to the foregoing channel selection information and the timeslot division information within a same superframe; the coordinator receives data sent by the node, and transmits an acknowledgment message to the node that has transmitted data successfully, so that the node makes statistics of received data and transmitted data. In this way, the node determines channel quality according to data transmission situations to switch a channel accordingly within a superframe to implement data transmission, which shortens a switching period, improves a processing speed of a device, and ensures a timely response to unpredictable interference, thereby improving reliability of data interaction.

Figure 4:
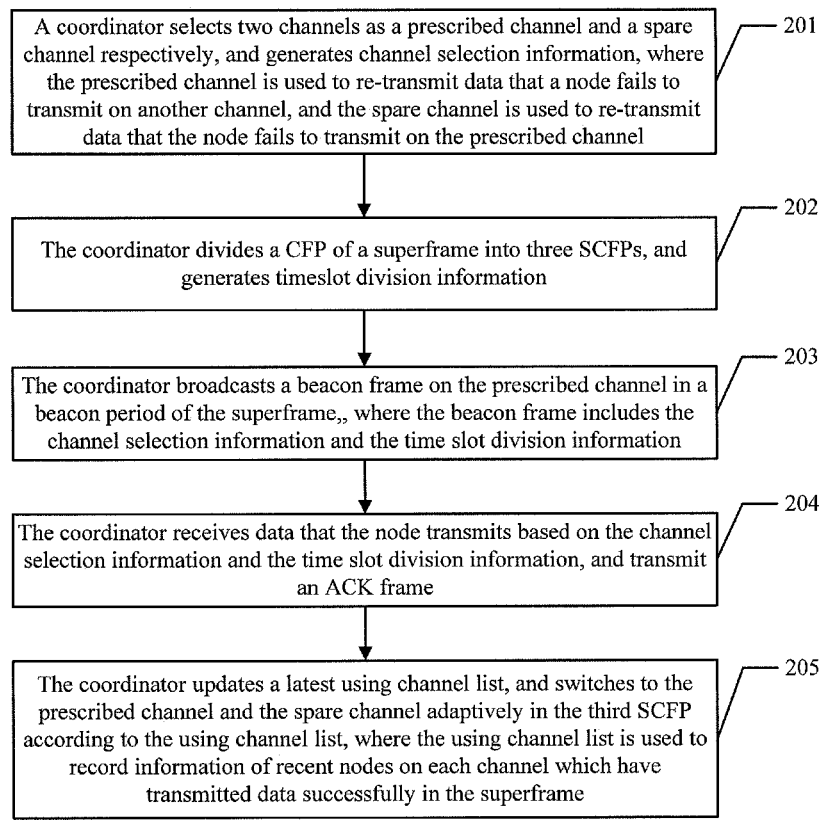
FIG. 4 is a schematic diagram of a data transmission method according to another embodiment of the present invention.

For ease of understanding, the following describes a data transmission method in the technical solutions of the present invention in detail by using another embodiment as an example. As shown in FIG. 4, a data transmission method provided in an embodiment of the present invention includes:

201. A coordinator selects two channels as a prescribed channel and a spare channel respectively, and generates channel selection information, where the prescribed channel is used to re-transmit data that a node fails to transmit on another channel, and the spare channel is used to re-transmit data that the node fails to transmit on the prescribed channel.

In this embodiment, based on the GB/T15629.15-2010 standard, a frequency band of 470 Megahertz (MHz) and 510 Megahertz (MHz) is divided into multiple channels, each with a certain amount of bandwidth; a coordinator of a personal area network scans channel quality, and selects two channels of best channel quality as a prescribed channel and a spare channel respectively, and generates channel selection information, where the prescribed channel is used to re-transmit, when channel quality is poor, data that a node fails to transmit on another channel; the spare channel is used to re-transmit, when channel quality is poor, data that the node fails to transmit on the prescribed channel; and the prescribed channel is further used to transmit a beacon frame and is used by the node to apply for network access. Other channels than the prescribed channel and the spare channel are numbered by the node in sequence and are used as data channels for transmitting data.

Figure 5:
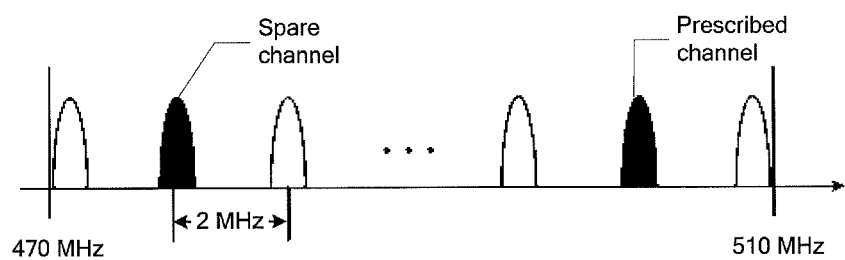
FIG. 5 is a schematic diagram of channel division and selection according to an embodiment of the present invention.

A schematic diagram of channel division and selection is shown in FIG. 5, where a frequency band of 470-510 MHz is divided into several channels with a frequency bandwidth of 2 MHz, and two channels of best channel quality are respectively used as the prescribed channel and the spare channel.

Because the prescribed channel has the best channel quality, the coordinator transmits a beacon frame on the prescribed channel; after a node receives the beacon frame, the node uses the prescribed channel to apply for network access, and transmits data on the prescribed channel after accessing the network successfully. The coordinator allocates an intra-network 16-bit short address to the node that has accessed the network successfully, so that the node easily transmits data on a corresponding channel in an SCFP based on frequency hopping parameters, where the short address starts from 0x0001 and increases sequentially, that is, 0x0001, 0x0002, 0x0003, . . . and so on.

202. The coordinator divides a CFP of a superframe into three SCFPs, and generates timeslot division information.

In this embodiment, a CFP of a same superframe is divided into three SCFPs, and timeslot division information is generated, where the three SCFPs include a first SCFP, a second SCFP, and a third SCFP; the number of timeslots in the first SCFP is the same as the number of timeslots in the second SCFP; the second SCFP is used to re-transmit data that a node fails to transmit in the first SCFP; the third SCFP is used to re-transmit data that the node fails to transmit in the second SCFP, and the third SCFP is further used to continue transmitting data that the node does not transmit completely in the first SCFP or the second SCFP, and a timeslot position of each node in the first SCFP is the same as in the second SCFP, that is, for a node, the timeslot position in the first SCFP is the same as the timeslot position in the second SCFP. If the node fails to transmit data in a timeslot in the first SCFP, the node re-transmits the data in this timeslot in the second SCFP. In this way, when the coordinator receives data in different timeslots, the coordinator may determine by which node the data is transmitted.

In the first SCFP, the coordinator allocates a timeslot to each node; and during the allocation, it needs to be ensured that a length of each timeslot is sufficient for a meter node to complete a procedure (for example, 5 milliseconds) of uploading data and receiving an acknowledgement frame. Nodes transmit data in their respective allocated timeslots and channels.

Specifically, when the node fails to transmit data in the first SCFP, the node switches to the prescribed channel in the second SCFP to re-transmit the data, where the second SCFP is prepared specially by the coordinator for the node that fails to transmit data in the first SCFP, and the node that fails to transmit data re-transmits the data in a timeslot corresponding to the first SCFP.

Further, because some nodes cannot transmit all data in one timeslot in the first SCFP or still fail to transmit data in the second SCFP, these nodes need an additional timeslot resource to transmit fragmented or re-transmitted data. These nodes re-transmit data in the third SCFP, where the data is transmitted in a timeslot in the third SCFP agreed by the coordinator and these nodes. The third SCFP is an additional timeslot resource that the coordinator allocates to nodes that fail to transmit data or do not transmit data completely in the first SCFP and the second SCFP.

203. The coordinator broadcasts, in a beacon period of the superframe, a beacon frame on the prescribed channel, where the beacon frame includes the channel selection information and the timeslot division information.

The beacon frame is transmitted in a first timeslot in the superframe, and the coordinator broadcasts the beacon frame on the selected prescribed channel in the beacon period of the same superframe, where the broadcast beacon frame includes the channel selection information and the timeslot division information; and a node that receives the broadcast beacon frame may learn, according to the channel selection information and the timeslot division information included in the beacon frame, the prescribed channel and the spare channel and information of the divided three SCFPs.

In this embodiment, a frame structure of the beacon frame includes an SCFP field. Apparently, the superframe also includes an SCFP field, and a beacon payload field in the frame structure includes a channel type identifier.

Specifically, the frame structure of the beacon frame is shown in Table 1.

TABLE 1

| Byte: 2 | 1 | 4/10 | 0/5/6/10/14 | 2/3 | Variable | Variable | Variable | 2 |
|---|---|---|---|---|---|---|---|---|
| Frame control | Frame sequence number | Address information | Auxiliary safety header | Superframe description | SCFP field | Address field to be processed | Beacon payload | FCS |
| MHR | | | | MAC payload | | | | MFR |

In the foregoing Table 1, the beacon payload field includes a channel type identifier; the FCS (Frame Check Sequence) is a last field and is used to store a CRC (Cyclical Redundancy Check) value of the frame.

In the beacon frame, a timeslot granularity is first re-defined in the superframe description area. The number of timeslots always needs to be increased accordingly in the CAP or in the CFP to meet requirements of a meter reading scenario. Correspondingly, the number of bytes needs to be added in the bits "last timeslot in the CAP". Specifically, the superframe description area is shown in Table 2.

TABLE 2

| Bit: 0-2 | 3-5 | 6-12 | 13 | 14 | 15 |
|---|---|---|---|---|---|
| Beacon sequence | Superframe sequence | The last timeslot in the CAP | Battery life extension (BLE) | PAN coordinator | Association permit |

Further, the SCFP field includes an SCFP specification and an SCFP list, where the SCFP specification includes the following fields: an SCFP count field, an authentication request field, an unauthenticated permit field, and an SCFP permit field; and the SCFP list includes an SCFP identifier field, a start timeslot field, a continuous timeslot count field, and a frequency hopping parameter field, as shown in Table 3.

TABLE 3

| Octet: 1 | Variable |
|---|---|
| SCFP specification | SCFP list |

Specifically, as shown in Table 4, in the SCFP specification, the SCFP count field is described by two bytes; 00, 01, 10, and 11 respectively represent that there are 0, 1, and 3 SCFP areas in the superframe. Such fields as an authentication request field, an unauthenticated permit field, and an SCFP permit field are further included, which is similar to the prior art and is not further described.

TABLE 4

| 0-1 | 2 | 3 | 4 | 5-7 |
|---|---|---|---|---|
| SCFP count | Authentication request | Unauthenticated permit | SCFP permit | Reserved |

As shown in Table 5, the SCFP list includes a device short address field, an SCFP identifier field, a start timeslot field, a continuous timeslot count field, a frequency hopping parameter field, and a fragment field, where:

the device short address field indicates what device it is;

the SCFP identifier field indicates an SCFP where the node is located, and 01, 10, and 11 represent the first SCFP, the second SCFP, and the third SCFP respectively;

description bits of the start timeslot field include a 7-bit binary number, which can describe timeslots till a $127^{th}$ timeslot;

description bits of the continuous timeslot count field include a 6-bit binary number. Considering that there is uncertainty about resources allocated to other nodes in the third SCFP, bits are added to describe enough timeslots;

the frequency hopping parameter field is used to regulate and control a channel on which the node transmits a data frame in the first SCFP; and the fragment field is used to indicate whether the data is fragmented. Because nodes may serve different purposes and a data packet length of a meter node is different from a data packet length of another node. When the timeslot length meets only data packet length requirements of a meter node, some nodes need to transmit data by fragments. 0 indicates that the data is not fragmented, and 1 indicates that the data is fragmented.

TABLE 5

| Bit: 0-15 | 16-20 | 37-39 | 24-25 | 26-32 | 33-38 | 39 | 40-55 | 56-72 (optional) |
|---|---|---|---|---|---|---|---|---|
| Device short address | Frequency hopping parameter | Reserved | SCFP 1 identifier | Start timeslot | Continuous timeslot count | Fragment | SCFP 2 identifier | SCFP 3 identifier . . . |

The following Table 6 shows that channels i and j in a seventh channel page are selected from 470-510 MHz as a prescribed channel and a spare channel respectively, and other channels are regarded by the node as data channels by default and arranged in an ascending order. For example, two channels are selected from 20 channels of 470-510 MHz as the prescribed channel and the spare channel, and the remaining 18 channels are arranged in an ascending order according to channel numbers.

TABLE 6

| Channel page bit: 5 bit | Channel number: 5 bit | Type identifier: 2 bit | Reserved: 4 bit |
|---|---|---|---|
| 00111 | i | 01 | |
| 00111 | j | 10 | |

204. The coordinator receives data that the node transmits based on the channel selection information and the timeslot division information, and transmit an ACK frame.

Data that the node transmits based on the channel selection information and the timeslot division information is received, and an ACK frame is transmitted to the node that has transmitted the data successfully.

205. The coordinator updates a latest using channel list, and switches to the prescribed channel and the spare channel adaptively in the third SCFP according to the using channel list, where the using channel list is used to record information of recent nodes on each channel which have transmitted data successfully within the superframe.

The coordinator updates the latest using channel list according to details of recent channels that have received data successfully within the superframe, switches to the prescribed channel and the spare channel adaptively in the third SCFP according to the using channel list to receive data sent by the node and transmits an ACK frame, where the using channel list records nodes corresponding to data received by each channel successfully for the most recent time. For example, the coordinator and six nodes implement data transmission. Specific content of the using channel using is shown in Table 7.

TABLE 7

| Node 1 | Channel 1 |
| Node 2 | Channel 2 |
| Node 3 | Prescribed channel |
| Node 4 | Channel 4 |
| Node 5 | Channel 1 |
| Node 6 | Channel 2 |

It should be noted that, if data sent by a node is received on the prescribed channel, information of the node that transmits the data is recorded. Specifically, if data sent by a node is received on the prescribed channel, it indicates that the data may be re-transmitted on the prescribed channel by the node after the node fails to transmit the data on another data channel, and the information of the node that transmits the data is recorded and serves as a basis for determining a channel that receives data in a next SCFP.

Further, if data sent by a node is not received or data received from a node is smaller than normal in a preset number of superframe periods, the coordinator switches to the spare channel to receive data from the node. For example, when there is an uninterrupted strong interference source near the PAN, especially when the prescribed channel of the whole PAN is continuously exposed to interference, the node cannot receive a beacon frame and thus does not upload data. If the coordinator fails to receive data or data received by the coordinator is smaller than normal in a preset number of superframe periods, for example, two superframe periods or three superframe periods or more superframe periods, it indicates that the node cannot transmit data normally on the prescribed channel Therefore, the coordinator switches to the spare channel automatically to receive data. Herein, it is determined, according to channel quality in the PAN, whether or not the received data size is normal.

Figure 6:
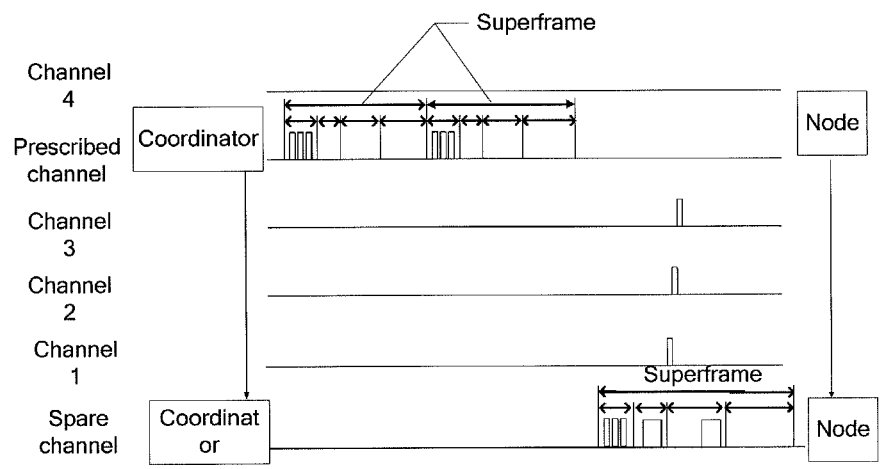
FIG. 6 is a schematic diagram illustrating switching from a prescribed channel to a spare channel by a coordinator and a node to respectively receive and transmit data according to an embodiment of the present invention.

A specific process of switching from a prescribed channel to a spare channel is shown in FIG. 6. If a node fails to receive a beacon frame in two superframe periods, the node switches from the prescribed channel to the spare channel to implement data transmission. If the coordinator fails to receive data from a node in two superframe periods, the coordinator also switches to the spare channel to receive data.

Figure 7:
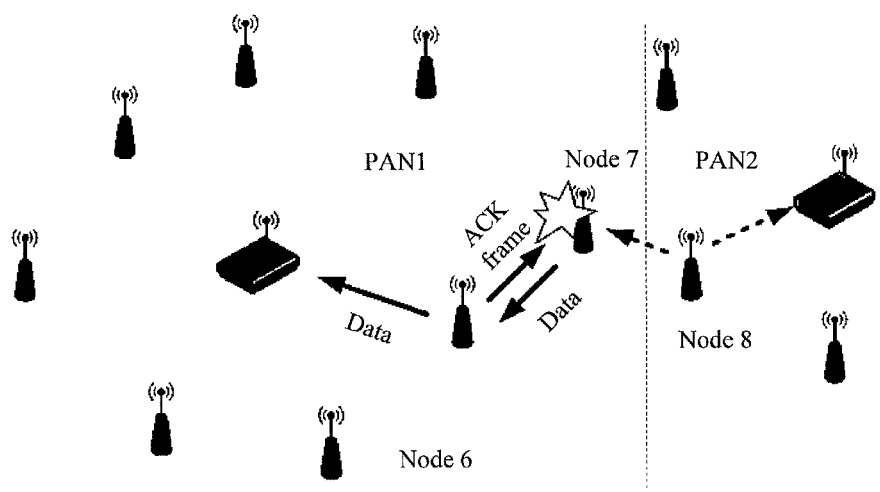
FIG. 7 is a schematic diagram illustrating interference to nodes that are in a parent-child relationship and on a home area network of a tree topology according to an embodiment of the present invention.

It should be noted that, the data transmission method in this embodiment is also applicable to a home area network with a low complexity and a 2-hop tree topology. The coordinator regards nodes in a parent-child relationship as a virtual node, where the virtual node includes a parent node and at least one child node that has a parent-child relationship with the parent node; the parent node is a routing node, and multiple timeslots are included in the first SCFP and the second SCFP or the third SCFP, and more timeslots are allocated to the virtual node. Specifically, as shown in FIG. 7, when node 7 is exposed to interference from node 8 on a neighboring PAN, or when routing node 6 is subject to pulse interference in a cell, data of node 7 cannot be transmitted successfully. Based on the foregoing solution, an improvement is made to the timeslot allocation; the coordinator regards routing node 6 and node 7 that are in a parent-child relationship as a virtual node, allocates a large SCFP to the virtual node, and allocates more timeslots in the first SCFP and the second SCFP to the virtual node than it allocates to other nodes, in order to meet data transmission requirements. When routing node 6 and node 7 fail to update data in the first SCFP, routing node 6 and node 7 re-transmit the data in corresponding timeslots in the second SCFP, and the routing node should, like the coordinator, have a function of receiving and transmitting data on the prescribed channel in the second SCFP.

Further, because interference is changing, the coordinator needs to scan channel quality periodically, re-selects a prescribed channel and a spare channel according to a scanning result, and updates the prescribed channel and the spare channel periodically to increase efficiency in transmitting data packets.

In this embodiment of the present invention, a coordinator selects two channels of best channel quality as a prescribed channel and a spare channel respectively, and generates channel selection information, where the prescribed channel is used to re-transmit data that a node fails to transmit on another channel, and the spare channel is used to re-transmit data that the node fails to transmit on the prescribed channel; the coordinator divides a CFP of a superframe into three SCFPs, and generates timeslot division information, where a second SCFP of the three SCFPs is used to re-transmit data that the node fails to transmit in a first SCFP, a third SCFP is used to re-transmit data that the node fails to transmit in the second SCFP and is further used to continue transmitting data that the node fails to transmit completely in the first SCFP or the second SCFP, and a timeslot position of each node in the first SCFP is the same as in the second SCFP; when the node fails to transmit data in the first SCFP, the node switches to the prescribed channel in the second SCFP to re-transmit the data; when failing to re-transmit the data on the prescribed channel, the node switches to the spare channel for transmission, which increases data transmission efficiency. Moreover, the coordinator updates a latest using channel list, where the using channel list is used to record information of recent nodes on each channel which have transmitted data successfully within a superframe, and switches to the prescribed channel and the spare channel adaptively in the third SCFP according to the using channel list. In this way, a frequency hopping-retransmission channel detection mechanism is established in the first two SCFPs, and meanwhile a simple and controllable random frequency hopping algorithm is proposed, which improves system resistance to interference and enhances link stability and data transmission reliability; and the prescribed channel and the spare channel are updated periodically, a latest using channel list is updated, and channel quality is dynamically monitored on a per SCFP basis within a superframe, which improves data transmission efficiency.

Figure 8:
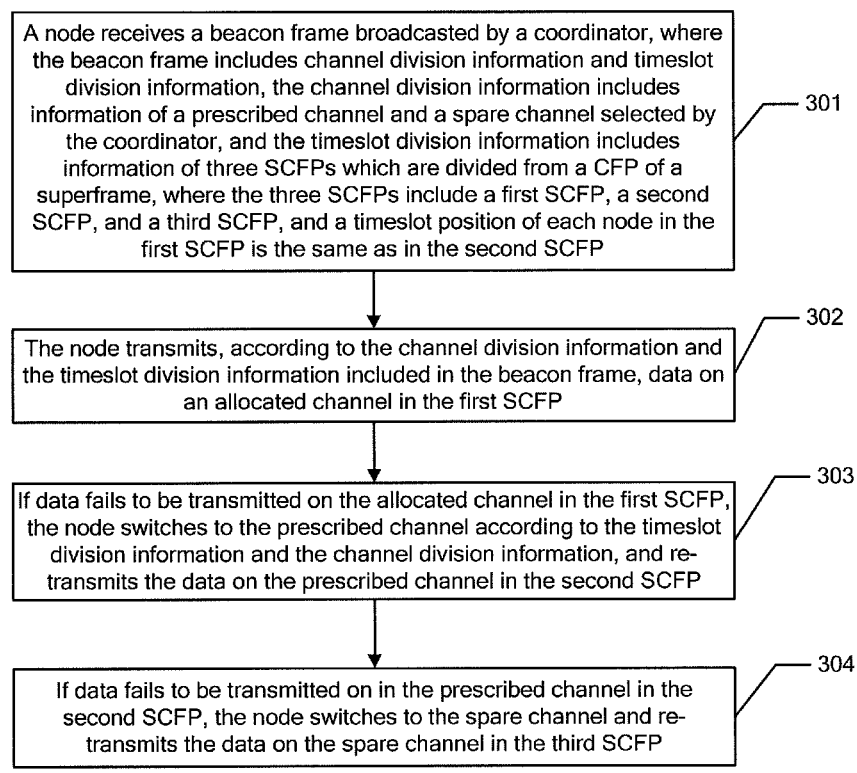
FIG. 8 is a schematic diagram of a data transmission method according to another embodiment of the present invention.

The following describes, from a perspective of a node, a data transmission method provided by an embodiment of the present invention. As shown in FIG. 8, a data transmission method according to another the embodiment of the present invention includes:

301. A node receives a beacon frame broadcast by a coordinator, where the beacon frame includes channel division information and timeslot division information, the channel division information includes information of a prescribed channel and a spare channel selected by the coordinator, and the timeslot division information includes information of three SCFPs which are divided from a CFP of a superframe, where the three SCFPs include a first SCFP, a second SCFP, and a third SCFP and a timeslot position of each node in the first SCFP is the same as in the second SCFP.

The node receives a beacon frame broadcast by the coordinator, where the beacon frame includes channel division information and timeslot division information, the channel division information includes information of a prescribed channel and a spare channel selected by the coordinator; the prescribed channel used to re-transmit data that the node fails to transmit on another channel; the spare channel is used to re-transmit data that the node fails to transmit on the prescribed channel; and the prescribed channel is further used to transmit a beacon frame and is used by the node to apply for network access.

Further, the timeslot division information includes information of three SCFPs which are divided from a CFP of a superframe, where the second SCFP is used to re-transmit data that the node fails to transmit in the first SCFP, the third SCFP is used to re-transmit data that the node fails to transmit in the second SCFP, and a timeslot position of each node in the first SCFP is the same as in the second SCFP, that is, for a node, the timeslot position in the first SCFP is the same as the timeslot position in the second SCFP. If the node fails to transmit data in a timeslot in the first SCFP, the node re-transmits the data in this timeslot in the second SCFP. In this way, when the coordinator receives data in different timeslots, the coordinator may determine by which node the data is transmitted.

302. The node transmits, according to the channel division information and the timeslot division information included in the beacon frame, data on an allocated channel in the first SCFP.

The node learns, according to the channel division information included in the received beacon frame, which two channels are selected by the coordinator as the prescribed channel and the spare channel, and information of a channel allocated to the node; and the node learns, according to the timeslot division information included in the received beacon frame, that the coordinator has divided a CFP of a superframe into three SCFPs, and then the node first transmits data on the allocated channel in the first SCFP.

303. If data fails to be transmitted on the allocated channel in the first SCFP, the node switches to the prescribed channel according to the timeslot division information and the channel division information, and re-transmits the data on the prescribed channel in the second SCFP.

The node transmits only one data packet in the first SCFP; if the node fails to transmit data in the first SCFP, it indicates that the channel quality is poor, and the node does not re-transmit the data immediately. Instead, the node switches to the prescribed channel of better channel quality according to the received channel division information broadcast by the coordinator, and re-transmits the data in the second SCFP. There are two cases when the node fails to transmit data: One case is a data packet loss, for example, the coordinator is exposed to pulse interference from another node outside the network when the coordinator is receiving a data packet of the node, and consequently the coordinator generates a bit error, which causes a check failure; the other case is a loss of an acknowledgement frame, for example, when the coordinator feeds back an ACK frame to the node, the node fails to receive the ACK frame due to interference from data transmission by a neighboring node.

304. If data fails to be transmitted on the prescribed channel in the second SCFP, the node switches to the spare channel and re-transmits the data on the spare channel in the third SCFP.

If the node still fails to transmit the data on the prescribed channel in the second SCFP, it indicates that the current prescribed channel has poor channel quality, and the node does not re-transmit the data immediately. Instead, the node switches to the spare channel and re-transmits the data on the spare channel in the third SCFP.

In this embodiment of the present invention, a node receives a beacon frame broadcast by a coordinator, and transmits, according to channel division information and timeslot division information included in the beacon frame, data on an allocated channel in a first SCFP; if data fails to be transmitted, the node switches to a prescribed channel and re-transmits the data on the prescribed channel in a second SCFP; if still failing to re-transmit the data, the node switches to a spare channel and re-transmits the data on the spare channel in a third SCFP. In this way, the node uses channel quality of each SCFP as a basis for transmitting data; if the node fails to transmit data in a previous SCFP, the node can immediately switch, in a next SCFP, to another channel of better channel quality to re-transmit the data, which shortens a switching period and improves data transmission efficiency.

Figure 9:
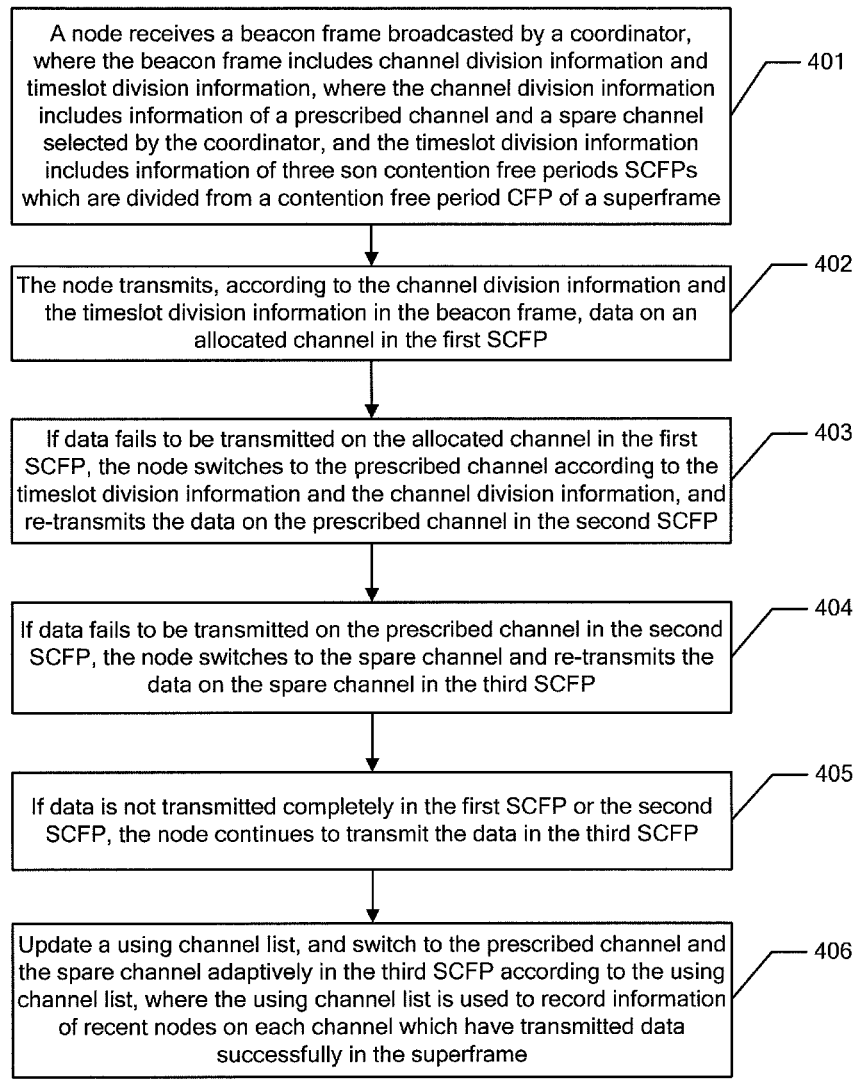
FIG. 9 is a schematic diagram of a data transmission method according to another embodiment of the present invention.

For ease of understanding, the following describes in detail a data transmission method provided in an embodiment of the present invention by using another embodiment as an example. As shown in FIG. 9, a data transmission method according to another embodiment of the present invention includes:

401. A node receives a beacon frame broadcast by a coordinator, where the beacon frame includes channel division information and timeslot division information, the channel division information includes information of a prescribed channel and a spare channel selected by the coordinator, and the timeslot division information includes information of three son contention free periods SCFPs which are divided from a contention free period CFP of a superframe.

The node receives a beacon frame broadcast by the coordinator, where the beacon frame includes channel division information and timeslot division information, the channel division information includes information of a prescribed channel and a spare channel selected by the coordinator; the prescribed channel used to re-transmit data that the node fails to transmit on another channel; the spare channel is used to re-transmit data that the node fails to transmit on the prescribed channel; and the prescribed channel is further used to transmit a beacon frame and is used by the node to apply for network access.

Further, the timeslot division information includes information of three SCFPs which are divided from a CFP of a superframe, where the second SCFP is used to re-transmit data that the node fails to transmit in the first SCFP, the third SCFP is used to re-transmit data that the node fails to transmit in the second SCFP, and a timeslot position of each node in the first SCFP is the same as in the second SCFP, that is, for a node, the timeslot position in the first SCFP is the same as the timeslot position in the second SCFP. If the node fails to transmit data in a timeslot in the first SCFP, the node re-transmits the data in this timeslot in the second SCFP. In this way, when the coordinator receives data in different timeslots, the coordinator may determine by which node the data is transmitted.

It should be noted that, the node needs to first apply for network access. Specifically, the node monitors a beacon frame on any one channel; if the node fails to monitor a beacon frame in a preset monitoring period, the node switches to a next channel to monitor a beacon frame until a beacon frame is monitored. If the node on a network fails to monitor a beacon frame in a preset number of continuous monitoring periods, it indicates that the node is disconnected from the system network and the node needs to re-apply for network access. The process of re-applying for network access again is the same as the foregoing process of initial network access. The monitoring period herein is greater than a superframe period for the purpose of avoiding missing a beacon frame due to a too short monitoring period. If the node monitors a beacon frame in the monitoring period, the node applies for network access on a prescribed channel on which the beacon frame is monitored, and transmits data on the prescribed channel.

Figure 10:
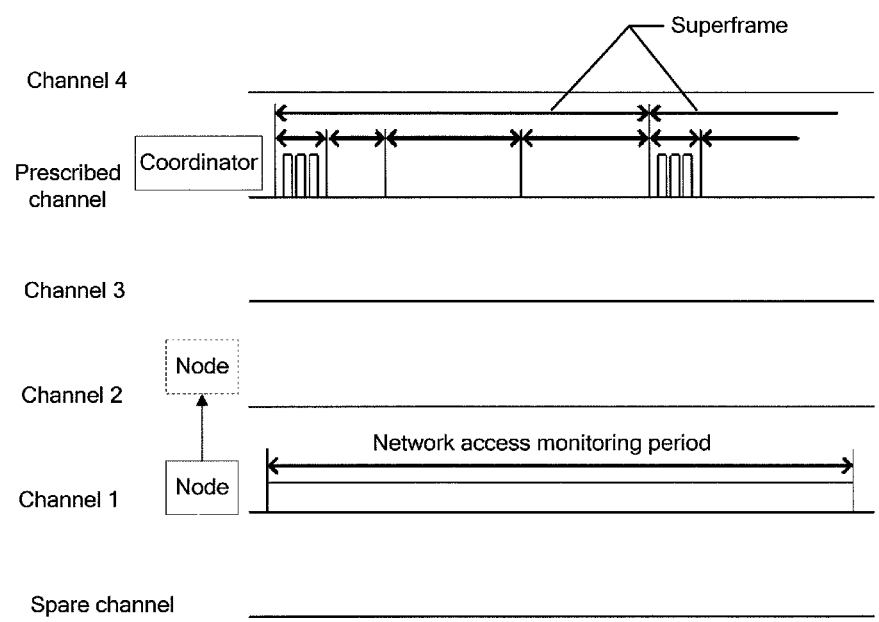
FIG. 10 is a schematic diagram illustrating a specific process of accessing a network by a node according to an embodiment of the present invention.

A specific process of accessing a network by a node is shown in FIG. 10. The node monitors a beacon frame on channel 1; if failing to monitor a beacon frame in a preset monitoring period, the node switches to channel 2 to monitor a beacon frame; a coordinator broadcasts a beacon frame on a prescribed channel; only when the node switches to the prescribed channel can it receive the beacon frame, where a network access monitoring period is greater than a superframe period.

402. The node transmits, according to the channel division information and the timeslot division information included in the beacon frame, data on an allocated channel in the first SCFP.

The node learns, according to the channel division information included in the received beacon frame, which two channels are selected by the coordinator as the prescribed channel and the spare channel, and information of a channel allocated to the node; and the node learns, according to the timeslot division information included in the received beacon frame, that the coordinator has divided a CFP of a superframe into three SCFPs, and then the node first transmits data on the allocated channel in the first SCFP.

403. If data fails to be transmitted on the allocated channel in the first SCFP, the node switches to the prescribed channel according to the timeslot division information and the channel division information, and re-transmits the data on the prescribed channel in the second SCFP.

The node transmits only one data packet in the first SCFP; if the node fails to transmit data in the first SCFP, it indicates that the channel quality may be relatively poor, and the node does not re-transmit the data immediately. Instead, the node switches to the prescribed channel of better channel quality according to the received channel division information broadcast by the coordinator, and re-transmits the data in the second SCFP. Specifically, a timeslot in the second SCFP used to re-transmit data on the prescribed channel is the same as a timeslot in the first SCFP used to transmit data on an allocated channel.

404. If data fails to be transmitted on the prescribed channel in the second SCFP, the node switches to the spare channel and re-transmits the data on the spare channel in the third SCFP.

If the node still fails to transmit data in the second SCFP, it indicates that the current prescribed channel has poor channel quality, and the node does not re-transmit the data immediately. Instead, the node switches to the spare channel and re-transmits data in a timeslot agreed between the coordinator and the node in the third SCFP.

405. If data fails to be transmitted completely in the first SCFP or the second SCFP, the node continues to transmit the data in the third SCFP.

If the node transmits data successfully in the first SCFP but the data is not transmitted completely, the node continues to transmit the data in an agreed timeslot, where the timeslot is a timeslot in the third SCFP agreed between the coordinator and the node. Specifically, the coordinator transmits information of the agreed timeslot to the node; after receiving the information of the agreed timeslot, the node knows the agreed timeslot from the information of the agreed timeslot, where the third SCFP is a timeslot resource allocated additionally by the coordinator to the node that fails to transmit data completely in the first SCFP.

If the node still fails to transmit all data completely in the second SCFP and needs an additional timeslot resource to transmit the data, the node continues to transmit the data in the third SCFP, where the third SCFP is also a timeslot resource allocated additionally by the coordinator to the node that fails to transmit data completely in the second SCFP.

Figure 11:
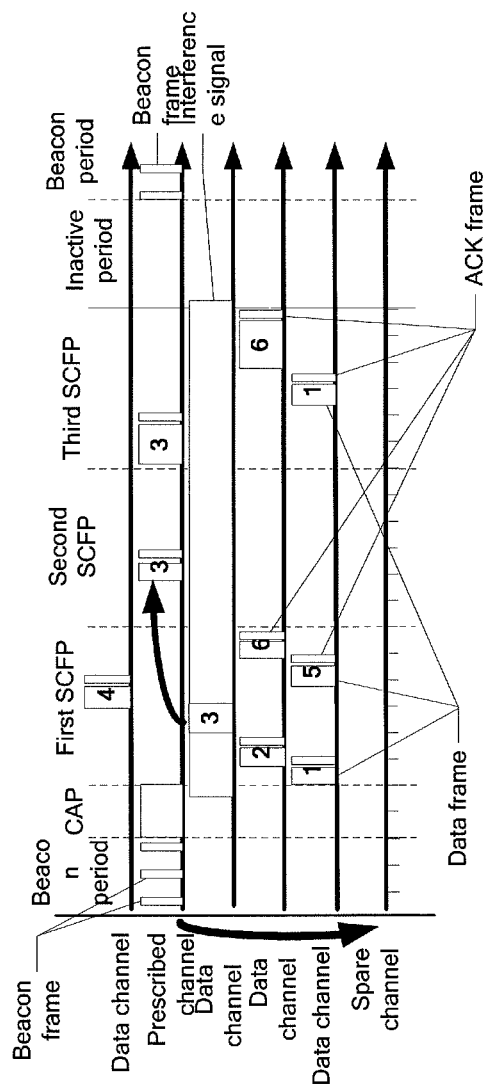
FIG. 11 is a schematic diagram illustrating a process of switching a channel according to an embodiment of the present invention when a node transmits data.

For ease of understanding, as shown in FIG. 11, a total of six nodes transmit data and receive an ACK frame on a channel, where: if node 3 fails to transmit data on a data channel in timeslot 3 in a first SCFP, node 3 switches to a prescribed channel and re-transmits data in also timeslot 3 of a second SCFP; if node 3 still fails to transmit data in timeslot 3 in the second SCFP or fails to transmit all the data completely and needs an additional timeslot resource to transmit data, node 3 switches to a spare channel and continues to transmit data in an agreed timeslot in a third SCFP.

It should be noted that, for a node that has transmitted data successfully and has no remaining data for transmission, the node may enter a hibernation state directly. The hibernation period is in units of a superframe length and lasts until a next superframe arrives. Because the coordinator transmits a data frame several times on the prescribed channel, there is always a chance for the node to monitor a beacon frame as long as the node wakes up from the hibernation state, based on which the arrival of a superframe is determined. For a node that has transmitted data successfully and still has remaining data that needs to be fragmented for transmission, it monitors the channel and continues to transmit the data upon arrival of an additional timeslot resource in the third SCFP. The node does not switch to the prescribed channel immediately but performs channel switching after several superframes according to a result of negotiation with the coordinator.

406. The node updates a using channel list, and switches to the prescribed channel and the spare channel adaptively in the third SCFP according to the using channel list, where the using channel list is used to record information of recent nodes on each channel which have transmitted data successfully in the superframe.

The node updates a using channel list, and switches a channel adaptively in the third SCFP according to the using channel list to implement data transmission, where the using channel list is used to record information of recent nodes on each channel which have transmitted data successfully in the superframe. A specific format of the using channel list is shown in the aforementioned Table 7.

In this embodiment of the present invention, a node establishes a frequency hopping-retransmission detection mechanism according to an allocated prescribed channel and a spare channel resource and timeslot resources of three SCFPs; when a channel is exposed to interference, the node switches the channel immediately in a same frame for transmission, which improves system resistance to interference; and when the node has additional fragmented data that needs to be re-transmitted, the node fully utilizes allocated timeslot resources, which increases reliability of data transmission. Moreover, quality of different channels is assessed in each timeslot in the first two SCFPs to generate a latest using channel list, and a channel between the node and a coordinator is switched adaptively in a third SCFP according to the using channel list, which achieves seamless switching.

Figure 12:
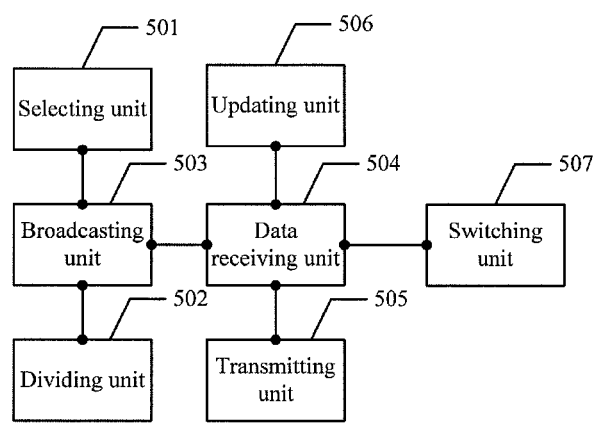
FIG. 12 is a schematic diagram of a coordinator according to an embodiment of the present invention.

The following describes a data transmission apparatus in the technical solutions of the present invention. As shown in FIG. 12, a coordinator provided in an embodiment of the present invention includes:

a selecting unit 501, configured to select two channels as a prescribed channel and a spare channel respectively, and generate channel selection information, where the prescribed channel is used to re-transmit data that a node fails to transmit on another channel, and the spare channel is used to re-transmit data that the node fails to transmit on the prescribed channel;

a dividing unit 502, configured to divide a CFP of a superframe into three SCFPs, and generate timeslot division information, where the three SCFPs include a first SCFP, a second SCFP, and a third SCFP; the second SCFP is used to re-transmit data that the node fails to transmit in the first SCFP; the third SCFP is used to re-transmit data that the node fails to transmit in the second SCFP; and a timeslot position of each node in the first SCFP is the same as in the second SCFP;

a broadcasting unit 503, configured to broadcast a beacon frame on the prescribed channel in a beacon period of the superframe, where the beacon frame includes the channel selection information and the timeslot division information;

a data receiving unit 504, configured to receive data that the node transmits based on the channel selection information and the timeslot division information; and a transmitting unit 505, configured to transmit an ACK frame.

Further, the third SCFP is further used to continue to transmit data that the node fails to transmit completely in the first SCFP or the second SCFP.

It should be noted that the coordinator provided in this embodiment of the present invention may further include:

an updating unit 506, configured to update a using channel list, where the using channel list is used to record information of recent nodes on each channel which have transmitted data successfully in the superframe; and a switching unit 507, configured to switch to the prescribed channel and the spare channel adaptively in the third SCFP according to the using channel list.

Further, the node is a virtual node and includes a parent node and at least one child node that has a parent-child relationship with the parent node, where the parent node is a routing node; and each of the first SCFP, the second SCFP or the third SCFP includes multiple timeslots, where the multiple timeslots are allocated to the parent node and the at least one child node respectively.

A frame structure of the foregoing beacon frame includes an SCFP field.

For details about specific processes of implementing respective functions by each unit of the coordinator provided in this embodiment of the present invention, reference may be made to related contents in the embodiments shown in FIG. 2 and FIG. 4, and details are not described herein again.

In this embodiment of the present invention, a selecting unit 501 selects two channels as a prescribed channel and a spare channel respectively, specifically, it may select two channels of best channel quality as a prescribed channel and a spare channel respectively, and generates channel selection information, where the prescribed channel is used to re-transmit data that a node fails to transmit on another channel, and the spare channel is used to re-transmit data that the node fails to transmit on the prescribed channel; a dividing unit 502 divides a CFP of a superframe into three SCFPs, and generates timeslot division information, where the three SCFPs includes a first SCFP, a second SCFP, and a third SCFP and channel quality of each SCFP is used as a basis for transmitting data. If data fails to be transmitted in a previous SCFP, the node may immediately switch to another channel of better channel quality in a next SCFP to re-transmit the data, which shortens a switching period and improves data transmission efficiency; and the second SCFP is used to re-transmit data that the node fails to re-transmit in the first SCFP, and the third SCFP is used to re-transmit data the node fails to transmit in the second SCFP; the third SCFP is further used to continue to transmit data that the node fails to transmit completely in the first SCFP or the second SCFP, and a timeslot position of each node in the first SCFP is the same as in the second SCFP. Then, a broadcasting unit 503 broadcasts a beacon frame on the prescribed channel in a beacon period of the same superframe, where the beacon frame includes the channel selection information and the timeslot division information, where a frame structure of the beacon frame includes an SCFP field; a data receiving unit 504 receives data that a node transmits based on the channel selection information and the timeslot division information, and a transmitting unit 505 transmits an ACK frame; an updating unit 506 updates a using channel list, where the using channel list is used to record information of recent nodes on each channel which have transmitted data successfully in a superframe; a switching unit 507 switches to the prescribed channel and the spare channel adaptively in the third SCFP according to the using channel list. Further, the node is a virtual node and includes a parent node and at least one child node that has a parent-child relationship with the parent node, where the parent node is a routing node; the first SCFP, the second SCFP or the third SCFP includes multiple timeslots and is allocated to the parent node and the at least one child node respectively. In this way, a channel is switched accordingly in a same superframe, which shortens a switching period, increases a processing speed of a device, ensures a timely response to unpredictable interference, and improves reliability of data interaction. In addition, the frame structure of the beacon frame is modified accordingly to meet requirements of transmitting data in an SCFP.

Figure 13:
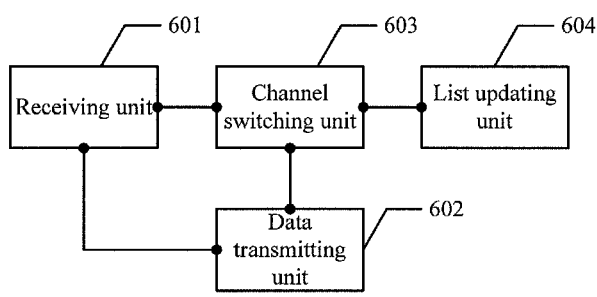
FIG. 13 is a schematic diagram of a node according to an embodiment of the present invention.

A data transmission apparatus provided in an embodiment of the present invention further includes a node. As shown in FIG. 13, a node provided in an embodiment of the present invention includes:

a receiving unit 601, configured to receive a beacon frame, where the beacon frame includes channel division information and timeslot division information, the channel division information includes information of a prescribed channel and a spare channel selected by a coordinator, and the timeslot division information includes information of three son contention free periods SCFPs which are divided from a contention free period CFP of a superframe, where the three SCFPs include a first SCFP, a second SCFP, and a third SCFP and a timeslot position of each node in the first SCFP is the same as in the second SCFP;

a data transmitting unit 602, configured to transmit, according to the channel division information and the timeslot division information, data on an allocated channel in the first SCFP; and a channel switching unit 603, configured to: if data fails to be transmitted on the allocated channel in the first SCFP, switch to the prescribed channel according to the timeslot division information and the channel division information; and if data fails to be transmitted on the prescribed channel in the second SCFP, switch to the spare channel, where:

the data transmitting unit 602 is further configured to re-transmit data on the prescribed channel in the second SCFP after the channel switching unit 603 switches to the prescribed channel, and re-transmit data in the third SCFP after the channel switching unit 603 switches to the spare channel.

Further, the data transmitting unit 602 is further configured to: if data fails to be transmitted completely in the first SCFP or the second SCFP, continue to transmit the data in the third SCFP.

It should be noted that the node provided in this embodiment of the present invention may further include:

a list updating unit 604, configured to update a using channel list, where the using channel list is used to record information of recent nodes on each channel which have transmitted data successfully in the superframe.

Further, the channel switching unit 603 is further configured to switch to the prescribed channel and the spare channel adaptively in the third SCFP according to the using channel list.

For details about specific processes of implementing respective functions by each unit of the node provided in this embodiment of the present invention, reference may be made to related contents in the embodiments shown in FIG. 8 and FIG. 9, and details are not described herein again.

In this embodiment of the present invention, a receiving unit 601 receives a beacon frame, where the beacon frame includes channel division information and timeslot division information, the channel division information includes information of a prescribed channel and a spare channel selected by a coordinator, and the timeslot division information includes information of three son contention free periods SCFPs which are divided from a contention free period CFP of a superframe, where the three SCFPs includes a first SCFP, a second SCFP, and a third SCFP and a timeslot position of each node in the first SCFP is the same as in the second SCFP; a data transmitting unit 602 transmits, according to the channel division information and the timeslot division information, data on an allocated channel in the first SCFP; if data fails to be transmitted on the allocated channel in the first SCFP, a channel switching unit 603 switches to the prescribed channel according to the timeslot division information and the channel division information; and if data fails to be transmitted on the prescribed channel in the second SCFP, the channel switching unit 603 switches to the spare channel; after the channel switching unit 603 switches to the prescribed channel, the data transmitting unit 602 re-transmits data on the prescribed channel in the second SCFP; after the channel switching unit 603 switches to the spare channel, the data transmitting unit 602 re-transmits data in the third SCFP; if failing to transmit data completely in the first SCFP or the second SCFP, the data transmitting unit 602 continues to transmit the data in the third SCFP; a list updating unit 604 updates a using channel list, where the using channel list is used to record information of recent nodes on each channel which have transmitted data successfully in the superframe; the channel switching unit 603 switches to the prescribed channel and the spare channel adaptively in the third SCFP according to the using channel list. In this way, the node establishes a frequency hopping-retransmission channel detection mechanism according to the prescribed channel and spare channel resources allocated by the coordinator and timeslot resources of three SCFPs; and when a channel is exposed to interference, the channel is switched immediately in the same superframe for transmission, which improves system resistance to interference. In addition, when there is additional fragmented data that needs to be re-transmitted, allocated timeslot resources are fully utilized, which increases reliability of data transmission; and quality of different channels is assessed in each timeslot in first two SCFPs to generate a latest using channel list, and a channel between the node and the coordinator is switched adaptively in the third SCFP according to the latest using channel list, which achieves seamless switching.

A person of skill in the art may understand that all or a part of the steps of the methods in the embodiments may be implemented by a program instructing relevant hardware. The program may be stored in a computer readable storage medium. The storage medium may include: a read-only memory, a magnetic disk, an optical disc, or the like.

The data transmission method and apparatus according to the present invention are described in detail. With respect to the implementation manners and the application scope, modifications may be made by a person skilled in the art according to the idea of the present invention. Therefore, this specification shall not be construed as a limitation on the present invention.

What is claimed is:

1. A data transmission method, comprising:
   selecting, by a coordinator, a prescribed channel and a spare channel, and generating channel selection information, wherein the prescribed channel is used to re-transmit data that a node fails to transmit on another channel, and the spare channel is used to re-transmit data that the node fails to transmit on the prescribed channel;
   dividing a contention free period (CFP) of a superframe into three son contention free periods (SCFPs), and generating timeslot division information, wherein the three SCFPs comprise a first SCFP, a second SCFP, and a third SCFP; the second SCFP is used to re-transmit data that the node fails to transmit in the first SCFP; the third SCFP is used to re-transmit data that the node fails to transmit in the second SCFP; and an allocated timeslot position of the node in the first SCFP is the same as in the second SCFP, wherein when the node fails to transmit data in the allocated timeslot position in the first SCFP, the node re-transmits the data in the same allocated timeslot position in the second SCFP;
   broadcasting a beacon frame on the prescribed channel in a beacon period of the superframe, wherein the beacon frame comprises the channel selection information and the timeslot division information; and
   receiving data that the node transmits based on the channel selection information and the timeslot division information, and transmitting an acknowledgement frame.

2. The method according to claim 1, wherein:
   the third SCFP is further used to transmit data that the node does not transmit completely in the first SCFP or the second SCFP.

3. The method according to claim 1, wherein the method further comprises:
   updating a using channel list, wherein the using channel list is used to record information of recent nodes on each channel which have transmitted data successfully in the superframe; and
   switching to the prescribed channel and the spare channel adaptively in the third SCFP according to the using channel list.

4. The method according to claim 1, wherein:
   a frame structure of the beacon frame comprises an SCFP field.

5. A data transmission method, comprising:
   receiving, by a node, a beacon frame, wherein the beacon frame comprises channel division information and timeslot division information, the channel division information comprises information of a prescribed channel and a spare channel selected by a coordinator, and the timeslot division information comprises information of three son contention free periods (SCFPs) which are divided from a contention free period (CFP) of a superframe, wherein the three SCFPs comprise a first SCFP, a second SCFP, and a third SCFP, and an allocated timeslot position of the node in the first SCFP is the same as in the second SCFP, wherein when the node fails to transmit data in the allocated timeslot position in the first SCFP, the node re-transmits the data in the same allocated timeslot position in the second SCFP;
   transmitting, according to the channel division information and the timeslot division information, data on an allocated channel and in the allocated timeslot position in the first SCFP;
   if data fails to be transmitted on the allocated channel in the first SCFP, switching to the prescribed channel according to the timeslot division information and the channel division information, and re-transmitting the data on the prescribed channel and in the allocated timeslot position in the second SCFP; and
   if data fails to be transmitted on the prescribed channel in the second SCFP, switching to the spare channel and re-transmitting the data on the spare channel in the third SCFP.

6. The method according to claim 5, wherein the method further comprises:
   if data is not transmitted completely in the first SCFP or the second SCFP, transmitting data that the node fails to transmit in the third SCFP.

7. The method according to claim 5, wherein the method further comprises:
   updating a using channel list, wherein the using channel list is used to record information of recent nodes on each channel which have transmitted data successfully in the superframe; and
   switching to the prescribed channel and the spare channel adaptively in the third SCFP according to the using channel list.

8. The method according to claim 5, wherein:
   a frame structure of the beacon frame comprises an SCFP field.

9. A coordinator, comprising a processor and a non-transitory processor-readable medium having processor-executable instructions stored thereon, the processor-executable instructions including a plurality of units, the units including:
   a selecting unit, configured to select two channels as a prescribed channel and a spare channel respectively, and generate channel selection information, wherein the prescribed channel is used to re-transmit data that a node fails to transmit on another channel, and the spare channel is used to re-transmit data that the node fails to transmit on the prescribed channel;
   a dividing unit, configured to divide a contention free period (CFP) of a superframe into three son contention free periods (SCFPs), and generate timeslot division information, wherein the three SCFPs comprise a first SCFP, a second SCFP, and a third SCFP; the second SCFP is used to re-transmit data that the node fails to transmit in the first SCFP; the third SCFP is used to re-transmit data that the node fails to transmit in the second SCFP; and an allocated timeslot position of the node in the first SCFP is the same as in the second SCFP, wherein when the node fails to transmit data in the allocated timeslot position in the first SCFP, the node re-transmits the data in the same allocated timeslot position in the second SCFP;

a broadcasting unit, configured to broadcast, in a beacon period of the superframe, a beacon frame on the prescribed channel, wherein the beacon frame comprises the channel selection information and the timeslot division information;

a data receiving unit, configured to receive data that the node transmits based on the channel selection information and the timeslot division information; and a transmitting unit, configured to transmit an acknowledgement frame.

10. The coordinator according to claim 9, wherein:
the third SCFP is further used to transmit data that the node does not transmit completely in the first SCFP or the second SCFP.

11. The coordinator according to claim 9, wherein:
the coordinator further comprises:
an updating unit, configured to update a using channel list, wherein the using channel list is used to record information of recent nodes on each channel which have transmitted data successfully in the superframe; and
a switching unit, further configured to switch to the prescribed channel and the spare channel adaptively in the third SCFP according to the using channel list.

12. The coordinator according to claim 9, wherein:
a frame structure of the beacon frame comprises an SCFP field.

13. A node, comprising a processor and a non-transitory processor-readable medium having processor-executable instructions stored thereon, the processor-executable instructions including a plurality of units, the units including:

a receiving unit, configured to receive a beacon frame, wherein the beacon frame comprises channel division information and timeslot division information, the channel division information comprises information of a prescribed channel and a spare channel selected by a coordinator, and the timeslot division information comprises information of three son contention free periods (SCFPs) which are divided from a contention free period (CFP) of a superframe, wherein the three SCFPs comprise a first SCFP, a second SCFP, and a third SCFP, and an allocated timeslot position of the node in the first SCFP is the same as in the second SCFP, wherein when the node fails to transmit data in the allocated timeslot position in the first SCFP, the node re-transmits the data in the same allocated timeslot position in the second SCFP;

a data transmitting unit, configured to transmit, according to the channel division information and the timeslot division information, data on an allocated channel and in the allocated timeslot position in the first SCFP; and a channel switching unit, configured to: if data fails to be transmitted on the allocated channel in the first SCFP, switch to the prescribed channel according to the timeslot division information and the channel division information; and if data fails to be transmitted in the second SCFP, switch to the spare channel, wherein:

the data transmitting unit is further configured to re-transmit the data on the prescribed channel and in the allocated timeslot position in the second SCFP after the node switches to the prescribed channel, and re-transmit the data in the third SCFP after the node switches to the spare channel.

14. The node according to claim 13, wherein:
the data transmitting unit is further configured to: if data is not transmitted completely in the first SCFP or the second SCFP, transmit data that the node fails to transmit in the third SCFP.

15. The node according to claim 13, wherein:
the node further comprises:
a list updating unit, configured to update a using channel list, wherein the using channel list is used to record information of recent nodes on each channel which have transmitted data successfully in the superframe; and
the channel switching unit is further configured to switch to the prescribed channel and the spare channel adaptively in the third SCFP according to the using channel list.

16. The node according to claim 13, wherein:
a frame structure of the beacon frame comprises an SCFP field.

* * * * *